United States Patent [19]

Engelmann

[11] Patent Number: 4,566,999

[45] Date of Patent: Jan. 28, 1986

[54] PROCESS FOR THE PREPARATION OF ACID DYESTUFFS OF LOW ELECTROLYTE CONTENT OF THE TRIPHENYLMETHANE SERIES

[75] Inventor: Axel Engelmann, Frankfurt am Main, Fed. Rep. of Germany

[73] Assignee: Hoechst Aktiengesellschaft, Fed. Rep. of Germany

[21] Appl. No.: 589,883

[22] Filed: Mar. 15, 1984

[30] Foreign Application Priority Data

Mar. 18, 1983 [DE] Fed. Rep. of Germany ....... 3309726

[51] Int. Cl.⁴ .................... C09B 11/10; C09B 11/6
[52] U.S. Cl. .................................. 260/392; 260/386; 260/389; 260/391; 260/393; 260/394; 260/395
[58] Field of Search ............ 260/394, 389, 391, 392, 260/393, 395, 386

[56] References Cited

U.S. PATENT DOCUMENTS

| | | | |
|---|---|---|---|
| 331,964 | 12/1884 | Hassencamp | 260/392 |
| 353,264 | 11/1886 | Müller | 260/392 |
| 353,266 | 11/1886 | Müller | 260/392 |
| 2,192,118 | 2/1940 | Wolff et al. | 260/394 |
| 2,542,544 | 2/1951 | Loukomsky et al. | 260/391 |
| 2,555,603 | 6/1951 | Ogilvie | 260/392 |
| 2,567,965 | 9/1951 | Petke | 260/394 |
| 2,755,420 | 7/1956 | Locke | 260/391 |
| 4,247,470 | 1/1981 | Hermann et al. | 260/391 |

OTHER PUBLICATIONS

Scanlan, *J. Am. Chem. Soc.*, 1935, pp. 887–892, "The Preparation and Spectrophotometric Study of the Lower Basic Members".

Scanlan, *J. Am. Chem. Soc.*, 1936, pp. 1427–1429, "The Magenta Series, II., Some Higher Basic Members".

*Primary Examiner*—Glennon H. Hollrah
*Assistant Examiner*—Raymond Covington
*Attorney, Agent, or Firm*—Connolly and Hutz

[57] ABSTRACT

Process for the preparation of triphenylmethane dyestuffs of low electrolyte content, of the formula (A)

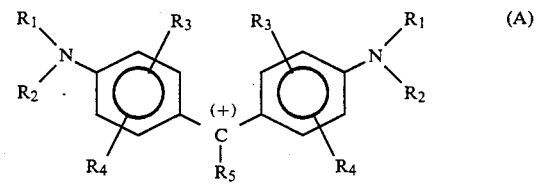

wherein $R_1$ and $R_2$ each denote hydrogen, $C_1$–$C_4$-alkyl, benzyl or sulfobenzyl, $R_3$ and $R_4$ each denote hydrogen, $C_1$–$C_4$-alkyl or —$SO_3H$ and $R_5$ denotes a phenyl, chlorophenyl, dialkylaminophenyl, alkyldialkylaminophenyl, alkoxyphenylaminophenyl, sulfoanilido, sulfanilidophenyl, disulfobenzylaminophenyl, disulfophenyl, disulfohydroxyphenyl, sulfonaphthyl, disulfonaphthyl, hydroxydisulfonaphthyl or alkylphenylaminosulfonaphthyl group, the dyestuff molecule containing at least one sulfonic acid group, in the form of their ammonium or alkaline earth metal salts, by dissolving the corresponding leuco-compounds of the dyestuffs of the formula (A) with aqueous ammonia solution or mixtures of aqueous ammonia solution and alkali metal hydroxide solution, and then (a) adjusting the pH to 1–4.5 by means of phosphoric acid and subsequently adding an aqueous suspension of manganese dioxide, or (b) initially adding an aqueous suspension of manganese dioxide and then adjusting the pH to 1–4.5 by means of phosphoric acid, or (c) allowing the solution of the leuco-compounds together with an aqueous suspension of manganese dioxide to run into the phosphoric acid, which has been initially introduced into the reaction vessel, in each case an equimolar amount, based on the manganese dioxide, of ammonia being present, and subsequently oxidizing the leuco-compounds at between 0° and 100° C. to give the corresponding triphenylmethane dyestuffs.

3 Claims, No Drawings

PROCESS FOR THE PREPARATION OF ACID DYESTUFFS OF LOW ELECTROLYTE CONTENT OF THE TRIPHENYLMETHANE SERIES

The present invention relates to a process for the preparation, in almost salt-free form, of water-soluble, acid dyestuffs of the triphenylmethane series containing at least one sulfonic acid group.

Triphenylmethane dyestuffs are usually prepared on an industrial scale by reacting the corresponding leuco-compounds in sulfuric acid solution with oxidizing agents, such as, for exaple, dichromate or preferably, for reasons of industrial hygiene, manganese dioxide [Hans Beyer, Lehrbuch der organischen Chemie (Textbook of Organic Chemistry), Verlag Hirzel, Leipzig (1967), page 518]. The dyestuffs are salted out of aqueous solution with ammonium, alkali metal or alkaline earth metal chlorides or sulfates. They are thereby usually obtained as resins containing a larger or smaller amount of salts, and as such are cumbersome to handle. The still deeply colored mother liquors with a high salt content require further chemical working up before they can be disposed of. In order, moreover, to free the dyestuffs further from the salt, additional purification steps are necessary. These can be physical (membrane filtration) or chemical in nature, the former usually not allowing a high material throughput per unit time, and the latter being associated with greater or lesser losses in product, depending on the solubility of the color acids on which the products are based.

It has now been found that by suitable choice of the mineral acid required during the oxidation of the leuco-compounds with manganese dioxide and of a suitable base for dissolving the leuco-acid, an almost salt-free solution of an acid triphenylmethane dyestuff can be obtained, from which the dyestuff can be isolated in a non-polluting manner by concentration. Colored mother liquors are no longer obtained here.

In detail, it has been found that triphenylmethane dyestuffs of low electrolyte content, of the general formula (A)

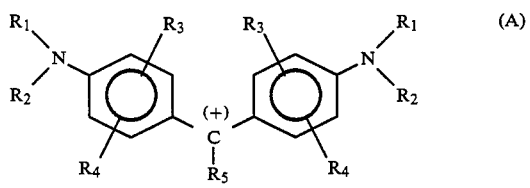

in which $R_1$ and $R_2$ each denote a hydrogen atom, an alkyl group of 1 to 4 carbon atoms, a benzyl group or a sulfobenzyl group, $R_3$ and $R_4$ each denote a hydrogen atom, an alkyl group of 1 to 4 carbon atoms or a sulfonic acid group and $R_5$ denotes a phenyl, chlorophenyl, dialkylaminophenyl, alkyldialkylaminophenyl, alkoxyphenylaminophenyl, sulfanilido, sulfanilidophenyl, disulfobenzylaminophenyl, disulfophenyl, disulfohydroxyphenyl, sulfonaphthyl, disulfonaphthyl, hydroxydisulfonaphthyl or alkylphenylaminosulfonaphthyl group, with the proviso that the dyestuff molecule contains at least one sulfonic acid group, can be prepared in the form of their ammonium or alkaline earth metal salts by dissolving the corresponding leuco-compounds of the dyestuffs of the formula (A) with aqueous ammonia solution or mixtures of aqueous ammonia solution and aqueous alkali metal hydroxide solution, and then (a) establishing a pH value of 1–4.5 by addition of phosphoric acid and subsequently adding an aqueous suspension of manganese dioxide, or (b) initially adding an aqueous suspension of manganese dioxide and then establishing a pH value of 1–4.5 by addition of phosphoric acid, or (c) allowing the solution of the leuco-compounds together with an aqueous suspension of manganese dioxide to run into the phosphoric acid, which has been initially introduced into the reaction vessel, it being necessary in each case for at least the equimolar amount, based on the manganese dioxide, of ammonia to be present, and subsequently oxidizing the leuco-compounds at temperatures between 0° and 100° C. to give the corresponding triphenylmethane dyestuffs.

In the process according to the invention, as is customary, manganese dioxide is employed in a molar excess, advantageously of about 20%, based on the leuco-compound to be oxidized.

If the leuco-compound to be oxidized already has a sufficiently acid reaction in aqueous solution, for example due to the content of more than two sulfonic acid groups in the molecule, ammonium dihydrogen phosphate may be added, instead of separate addition of aqueous ammonia solution and phosphoric acid, the desired pH value being established within the above-mentioned pH range.

The violet, blue and green dyestuffs of low electrolyte content which are obtainable according to the invention are suitable for dyeing wool, for preparing inks and, in the context of legal regulations, for coloring foodstuffs and cosmetics.

EXAMPLE 1

55 kg of ammonium hydrogen phosphate are added to 3,000 liters of an approximately 10% strength aqueous solution of sodium 4′,4″-bis[N-ethyl-N-sulfobenzylamino]-triphenylmethane-2-sulfonate and the mixture is heated to 95° C. 42 kg of manganese dioxide are then added in the form of a 10% strength aqueous suspension and the mixture is stirred at 95° C. for 15 minutes.

For working up, the pH value is adjusted to a value of 7 by addition of 20 kg of ammonia solution (20% strength). The mixture is then subsequently stirred for one hour, without being heated, a clarifying auxiliary is added and the precipitate is filtered off. About 320 kg of the substantially salt-free dyestuff of the formula

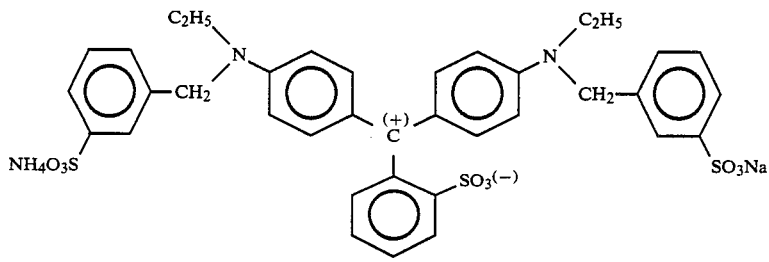

can be isolated from the filtrate by stripping off the water.

EXAMPLE 2

310 kg of 4',4''-bis-diethylamino-triphenylmethane-2,4-disulfonic acid are dissolved with 61 liters of ammonia solution (20% strength) and 49 liters of sodium hydroxide solution (33% strength) in water to make up to 3,000 liters and the solution is heated to 95° C. 230 kg of 75% strength phosphoric acid are then added, and immediately thereafter, 58 kg of manganese dioxide are added as rapidly as possible in the form of an approximately 10% strength aqueous suspension. The mixture is stirred at 95° C. for 15 minutes and the manganese ammonium phosphate which has precipitated is filtered off. 100 kg of calcium hydroxide are added to the filtrate and the mixture is subsequently stirred for 4 hours. A clarifying auxiliary is added and the precipitate is filtered off. About 320 kg of the substantially salt-free dyestuff of the formula

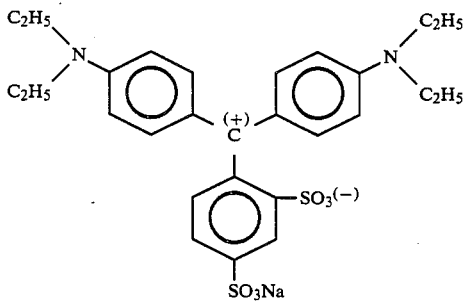

can be isolated from the filtrate by stripping off the water.

EXAMPLE 3

335 kg of 4',4''-bis-[N-ethyl-N-benzylamino]-triphenylmethane-2,4-disulfonic acid are dissolved with 55 liters of ammonia solution (20% strength) and 45 liters of sodium hydroxide solution (33% strength) in water to make up to 3,500 liters and the solution is heated to 94° C. 53 kg of manganese dioxide are then added in the form of an approximately 10% strength aqueous suspension. The pH value of the reaction solution is adjusted to 3.5 by allowing 230 kg of phosphoric acid (75% strength) to run in. The mixture is then subsequently stirred at the given temperature for 15 minutes, before the manganese ammonium phosphate which has precipitated is filtered off. 100 kg of calcium hydroxide are added to the filtrate and the mixture is subsequently stirred for 4 hours. After addition of a clarifying auxiliary, the precipitate is filtered off. About 340 kg of the substantially salt-free dyestuff of the formula

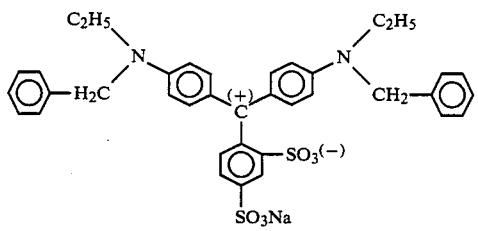

can be isolated from the filtrate by stripping off the water.

The dyestuff gives a greenish-tinged blue dyeing on wool, as do the dyestuffs obtainable according to Examples 1 and 2.

EXAMPLE 4

300 kg of 4',4''-bis-diethylamino-diphenylnaphthyl-1-methane-3,6-disulfonic acid are dissolved with 100 liters of ammonia solution (20% strength) in 2,700 liters of ice-water. 52 kg of manganese dioxide in the form of a 10% strength aqueous suspension are added at 0°–5° C., and 230 kg of phosphoric acid (75% strength) are then added. The mixture is then heated up to 70° C. and the manganese ammonium phosphate which has precipitated is filtered off. 100 kg of calcium hydroxide are added to the filtrate and the mixture is subsequently stirred for 6 hours. After addition of a clarifying auxiliary, the precipitate is filtered off. About 310 kg of the substantially salt-free dyestuff of the formula

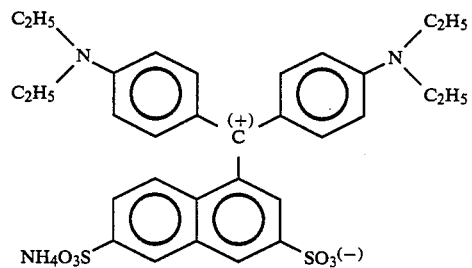

can be isolated from the filtrate by stripping off the water.

The dyestuff gives a neutral green dyeing on wool.

EXAMPLE 5

280 kg of 4',4''-bis-diethylamino-diphenyl-2,4-disulfo-1-hydroxy-triphenylmethane are dissolved with 100 liters of ammonia solution (20% strength) in water to make up to 2,900 liters. The solution is warmed to 70° C., 230 kg of phosphoric acid (75% strength) are added and immediately thereafter 52 kg of manganese dioxide are added in the form of a 10% strength suspension. The mixture is stirred at 70° C. for 15 minutes and the manganese ammonium phosphate which has precipitated is filtered off. The filtrate is stirred with 90 kg of calcium hydroxide for 4 hours. After addition of a clarifying auxiliary, the precipitate is filtered off. About 290 kg of the substantially salt-free dyestuff of the formula

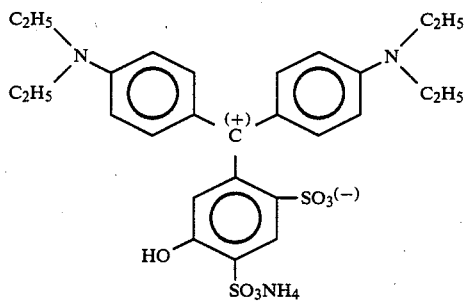

can be isolated from the filtrate by stripping off the water.

The dyestuff gives a blue dyeing on wool.

EXAMPLE 6

335 kg of 4',4''-bis-[N-ethyl-N-benzylamino]-triphenylmethane-2,4-disulfonic acid are dissolved with 55 liters of ammonia solution (20% strength) and 45 liters of sodium hydroxide solution (33% strength) in water to make up to 1,400 liters, by warming to 80° C. 53 kg of manganese dioxide are added in the form of an aqueous suspension of the highest possible concentration. This mixture is now allowed to run into a solution, warmed to 70° C., of 230 kg of phosphoric acid (75% strength) in 1,800 liters of water. After the mixture has been heated to 95° C., the manganese ammonium phosphate which has precipitated is filtered off. 100 kg of calcium hydroxide are added to the filtrate and the mixture is subsequently stirred for 4 hours. After addition of a clarifying auxiliary, the precipitate is filtered off. About 340 kg of the substantially salt-free dyestuff of the formula

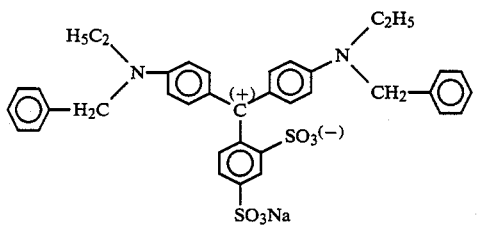

can be isolated from the filtrate by stripping off the water.

The dyestuff gives a greenish-tinged blue dyeing on wool.

I claim:

1. A process for the preparation of a triphenylmethane dyestuff of low electrolyte content, of the formula (A)

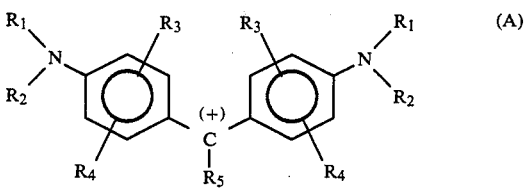

in which $R_1$ and $R_2$ each denote a hydrogen atom, an alkyl group of 1 to 4 carbon atoms, a benzyl group or a sulfobenzyl group, $R_3$ and $R_4$ each denote a hydrogen atom, an alkyl group of 1 to 4 carbon atoms or a sulfonic acid group and $R_5$ denotes a phenyl, chlorophenyl, dialkylaminophenyl, alkyldialkylaminophenyl, alkoxyphenylaminophenyl, sulfanilido, sulfanilidophenyl, disulfobenzylaminophenyl, sulfophenyl disulfophenyl, disulfohydroxyphenyl, sulfonaphthyl, disulfonaphthyl, hydroxydisulfonaphthyl or alkylphenylaminosulfonaphthyl group, with the proviso that the dyestuff molecule contains at least one sulfonic acid group, can be prepared in the form of its ammonium or alkaline earth metal salts, which comprises dissolving each mole of the corresponding leuco-compound of the dyestuff of the formula (A) with n−1 moles of aqueous ammonia solution or n−1 moles of a mixture of aqueous ammonia solution and an aqueous alkali metal hydroxide solution, n representing the number of $-SO_3^\ominus$-groups contained in the molecule of the said leuco compound, and then (a) establishing a pH value of 1–4.5 by addition of phosphoric acid and subsequently adding an aqueous suspension of about 100 to about 120 mole % based on this amount of leuco compound of manganese dioxide, or (b) initially adding an aqueous suspension of about 100 to about 120 mole % based on the amount of leuco compound of manganese dioxide and then establishing a pH value of 1–4.5 by addition of phosphoric acid, or (c) allowing the solution of the leuco-compound together with an aqueous suspension of about 100 to about 120 mole % based on the amount of leuco compound of manganese dioxide to run into the phosphoric acid, which has been initially introduced into the reaction vessel, in such an amount that the pH value of the mixture is 1 to 4.5, it being necessary in each case for at least the equimolar amount, based on the manganese dioxide, of ammonia to be present, and subsequently oxidizing the leuco-compound at temperatures between 0° to 100° C. to give the corresponding triphenylmethane dyestuffs.

2. A modification of the process for the preparation of a triphenylmethane dyestuff of low electrolyte content as claimed in claim 1, wherein the leuco-compound, which contains more than two sulfonic acid groups in the molecule, is dissolved in water, the desired pH value 1 to 4.5 is established by addition of ammonium dihydrogen phosphate and, after addition of the aqueous suspension of about 100 to about 120 mole % based on the amount of leuco compound of manganese dioxide, the leuco-compound is oxidized as claimed in claim 1, the ammonium dihydrogen phosphate being added in at least the equimolar amount, based on the manganese dioxide.

3. A process as claimed in claim 1, wherein $R_5$ of formula (A) denotes a sulfophenyl, disulfophenyl, disulfohydroxylphenyl, sulfonaphthyl, or disulfonaphthyl group.

* * * * *